United States Patent Office 3,108,883
Patented Oct. 29, 1963

3,108,883
METHOD OF SLICING MEAT
Paul A. Goeser, Chicago, Ill., assignor to Swift & Company, Chicago, Ill., a corporation of Illinois
No Drawing. Filed June 24, 1960, Ser. No. 38,434
17 Claims. (Cl. 99—194)

The present invention relates in general to a method of handling meat for slicing. More particularly the invention relates to an improvement in the method of producing relatively thin slices of unfrozen meat.

It has been considered commercially impossible or at least impractical to prepare relatively thin slices directly from unfrozen meat of substantially uniform thickness throughout the slice by slicing with a hand- or power-driven knife or saw blade. The reasons for this are that unfrozen meat lacks the rigidity necessary to permit a blade edge to cut cleanly through the meat and relatively thin slices do not hold their shape well but rather tend to pull apart during slicing. In addition, unfrozen meat is composed of lean, fat, and connective tissue portions which do not have the same resistance to a cutting blade.

As a result of the above mentioned problems encountered in slicing unfrozen meat, various other procedures have been attempted. Meat has been frozen solid and sliced. This procedure has several shortcomings. Solidly frozen meat is too hard to be sliced by hand operated blades and many conventional automatic meat slicers. The usual method of slicing hard frozen meat is with a mechanical meat saw. This has the disadvantage of sawdust loss of from 2–10%, depending on thickness. Furthermore, unless the slicing and subsequent handling are carried out at freezing temperatures deterioration in organoleptic qualities may arise if the meat thaws and is refrozen.

Perhaps the most commonly practiced method today involves forming a shaped block of meat, freezing it solid, and then tempering it (partially thawing) to properly condition it for slicing. This procedure involves a multiplicity of operations which are time-consuming and costly. Also, there is criticism of the resultant sliced product as being dry, lacking in flavor and having a short freezer storage life.

It is an object of my invention to provide a method of handling unfrozen meat for slicing such that slices of relatively uniform thickness throughout can be readily obtained.

An additional object of my invention is the provision of a method for thinly slicing unfrozen meat without distorting the meat.

A further object of the invention is to provide a method of slicing meat which substantially eliminates loss of juices therefrom.

A still further object of my invention is to provide a method whereby slices of unfrozen meat, substantially uniform in thickness throughout the slice, can be cut cleanly without fiber tearing and the resultant slice can be subsequently handled without distortion.

Further objects and advantages will become apparent to one skilled in the art from the following description of the invention.

I have discovered that meat can advantageously be sliced if the superficial surface of a portion of the meat is first frozen. By freezing of the "superficial surface" I intend to include freezing to any depth up to, but not including, the plane of slicing. Preferably the portion will lie in a plane generally parallel to the desired plane of cutting. By handling unfrozen meat in this manner, a cutting blade can cut cleanly through the unfrozen meat at a predetermined distance from the frozen surface without distorting the shape of the meat and without loss of juices from the meat.

In the preferred form of my novel method of slicing meat one surface of the unfrozen meat is contacted with a cold surface to freeze the most superficial layer of meat. The cold surface also steadies the meat mass during the cutting operation. In practicing this preferred method, the surface that is frozen is often less than $1/32$ of an inch thick and can be as thin as about 0.01 inch. It is, of course, possible to freeze the meat to a considerably greater depth, e.g. up to about an inch, and then make a slice through the fresh meat adjacent the frozen area. However, for most purposes freezing up to about $3/8–1/2$ inch would be the maximum, and for many purposes freezing less than a $1/32$ inch thickness of the meat surface is suitable. It is also feasible to freeze the superficial surface of the meat by other means, as for example by directing a spray of frigid gas at the meat surface. An example of this would be a jet of carbon dioxide gas that had been under compression. A cooling jet of air or other nontoxic and relatively unreactive gas could also be used. Such gas jets will rapidly freeze the superficial surface. An additional example of superficial freezing would be to dip the meat in a container of liquid nitrogen or brine. After these alternate forms of freezing, the surface can then be steadied (preferably uniformly at all points of the surface of the meat, e.g. by butting against a solid surface positioned generally parallel to the desired plane of cutting) while a slice is cut from the unfrozen meat adjacent the frozen superficial surface. When contact freezing is not employed, or when the meat is removed from the contact plate before slicing, it is preferred that the meat be frozen to a depth of $1/4$ to $1/2$ the thickness of the slice to be cut.

As has been mentioned, I preferably contact the surface of the meat adjacent the plane of cutting with a cold surface. By thus contact-freezing the superficial surface of the meat the meat surface will adhere to the cold surface. The adherence of the meat surface to the cold surface permits use of a movable cold surface by which the slice of meat can easily be transported away from the cutting zone. The movable cold surface may take the form of a refrigerated metal surface, such as a rotating cylinder, which cylinder passes the cutting zone and contact-freezes a surface of the meat. A slice is then cut from the unfrozen block of meat and the rotating cylinder carries the slice to another station where it can be removed or transferred to other means which transport the slice either to a freezer, a packaging station, etc. The movable surface may also take the form of an oscillating refrigerated plate operating to carry the slice away from the blade and returning to pick up the next slice in a continuing operation. A particularly suitable form of movable cold surface comprises a continuous metal foil (e.g. aluminum foil of about 1–10 mil thickness and preferably at least 2 mil thickness) which continuously passes over a refrigerated plate adjacent the cutting zone. The superficial surface of the meat is frozen and adhered to the foil sheet which then carries the slice away after it is severed from the meat mass. This form of movable surface is well adapted to removal of the slice by application of heat. For example, after passing the cutting zone the foil sheet can be passed over a surface heated sufficiently to allow release of the meat slice from the foil, if that is desired. The movable surface with the meat slice adhered thereto permits transporting of the slice and performance of subsequent operations (e.g. freezing, packing, etc.) without distortion of the slice. It is, of course, also possible to use a generally stationary cold surface. If this type freezing plate is used, the slice can be removed to permit contact-freezing of another surface of meat, as for example by picking off the slice with a doctor blade.

When utilizing my preferred form of freezing the superficial meat surface, I have found that unfrozen meat under the moderate pressure of merely butting the surface against a refrigerated surface (approximately 1 to 40 p.s.i. pressure) will freeze and adhere to a 10° F. freezing surface in about one minute. This may be perfectly satisfactory for some operations. However, to obtain an optimum freezing time of one second or less so that a substantially continuous commercially adaptable slicing operation can be achieved, the cold surface should not exceed about −40° F. Obviously the freezer plate temperature will vary according to the dictates of the particular installation and the speed of the slicing equipment utilized.

Placing the meat mass in the proper position for continuously freezing a superficial surface and cutting a slice can be achieved in a number of ways. For example, the meat mass can be placed by an operator in position for freezing and cutting and after a slice has been cut the mass can be moved by hand or an automatic pushing device into position to again freeze a superficial surface and cut a slice. Preferably, however, the meat mass, having a leading face and a trailing face, automatically moves along a path toward the freezing and cutting zones, as for example on a power-driven conveyor. The movement of the conveyor can be interrupted for the time required to freeze the meat surface and cut a slice, or the freezing and cutting can be accomplished at a speed such that by properly timing the conveyor it can operate continuously. It is also possible, with certain equipment, to synchronize movement of the cutting and freezing means so that the movement of the meat can be uninterrupted. If it is desired to form the meat mass into a particular shape for cutting slices of a predetermined cross-section (e.g. poultry or meat in loaf form), the meat can be passed through a forming tube, which tube terminates at a point spaced from the point of freezing and preferably closely adjacent the point of cutting.

I have found that slices of substantially uniform thickness throughout the slice can be prepared without distortion and without juice loss when following my above-described procedure. Relatively thin slices are readily obtainable. For example slices ranging in thickness from about 1/16 inch to about an inch are particularly well suited to preparation by my method. The meat (flesh of edible quadrupeds, poultry and fish) may be fresh or cooked and either in slab or block form or comminuted. Unless the blade to be used in cutting the meat is sufficiently sturdy to cut through bone, it is preferred that the meat be boneless. If fresh meat is used, the slices can, for example, be packaged and sold individually or stacked as fresh meat, or can be frozen individually or as a plurality of slices. Slices of cooked meat are especially adaptable to incorporation in frozen complete dinners which have sliced meat as a portion thereof. The cooked slices are also adaptable to prepare such items as cliced fully cooked hams. When comminuted meat is handled by my method, it is preferred to use the forming tube in placing the product in position for freezing and slicing. Comminuted meat patties are especially suited to preparation by my method.

The following examples of specific embodiments of my invention are for the purposes of illustration only and are not to be construed as limiting on the scope of the invention.

Example I

A block of boneless mutton leg was pressed against a rigid aluminum foil sheet refrigerated with Dry Ice and held in place. After about one minute the superficial surface of the meat block was frozen and firmly adhered to the foil sheet. A slice was cut in fresh unfrozen meat adjacent the point of contact of the meat and refrigerated surface of approximately 1/4 inch thickness by a power-driven meat band saw equipped with a nonserrated knife blade. The slide was of generally uniform thickness throughout and did not possess ragged edges. No fiber tearing or distortion of the slice or remainder of the meat mass was detectable. There was negligible juice loss from the meat slice. The foil sheet was used to transfer the slice in undistorted form to a freezer where the individual slice was packaged and frozen.

Example II

Boneless pork loins were pressed against a cold plate at about −40° F. until the meat had been frozen to a depth of about 1/16″ from the end. The meat was released from the plate with a doctor knife and a 1/4″ slice was cut parallel to the hardened end on a conventional slicer. The slice was of uniform thickness and could be handled without distortion.

Example III

Fresh ground hamburger meat was put into a cylindrical mold which opened at each end. The meat was pushed through the mold until about 1/2″ protruded from one end. This end was pressed against a 2 mil thick sheet of foil backed by Dry Ice and allowed to surface freeze to the foil. A 3/8″ slice was made in the unfrozen portion of the meat by a power-driven meat band saw equipped with a non-serrated knife blade. The trailing edge of the slice was not completely smooth in appearance, but slice thickness was uniform. The patty was transferred in the foil sheet to a freezer. Subsequently the frozen patty was pan fried and was considered satisfactory from a taste and texture standpoint.

Example IV

An enzyme injected 37 grade beef rib eye was placed in a 4″ round mold and an end was pressed against a −40° F. plate and allowed to remain one second to permit surface adherence. A two ounce (1/4″) steak was cut in the fresh meat, between the end of the mold and the surface adhered to the plate, by the same apparatus used in Example III. The procedure was repeated until the entire roll had been sliced. No fiber tearing, distortion of the slices, or juice loss occurred.

Example V

A pre-cooked turkey log, made by stuffing chunks of boneless turkey meat into an artificial casing, cooking, and removing the casing after cooking, was sliced into 1/16″ slices by surface freezing (less than about 1/32″ thickness was frozen) one end of the log to aluminum foil backed with Dry Ice and slicing with a fast-moving continuous knife blade. The slices were measured and weighed and found to be uniform in both respects. The slices could be handled without distortion.

Obviously many modifications and variations of the invention as hereinbefore set forth may be made without departing from the spirit and scope thereof, and therefore only such limitations should be imposed as are indicated in the appended claims.

I claim:

1. The method of preparing a slice of meat which comprises: freezing the superficial surface of a portion of an unfrozen meat mass, and slicing said portion from said mass along a plane extending through the unfrozen meat substantially parallel and adjacent the frozen superficial surface.

2. The method of preparing a slice of meat which comprises: contacting the superficial surface of a portion of an unfrozen meat mass with a cold surface whereby to freeze said superficial surface, and slicing said portion from said mass along a plane extending through the unfrozen meat substantially parallel and adjacent the frozen superficial surface.

3. The method of preparing a slice of meat which comprises: contacting the superficial surface of a portion of an unfrozen meat mass with a cold surface whereby to freeze said superficial surface, and slicing said portion from said mass along a plane extending through the unfrozen meat substantially parallel and adjacent the frozen superficial surface, and moving said slice along a path in a given direction.

4. The method of preparing a slice of meat which comprises: contacting the superficial surface of a portion of an unfrozen meat mass with a movable cold surface whereby to rapidly freeze said superficial surface and adhere said superficial surface to said cold surface, and slicing said portion from said mass along a plane extending through the unfrozen meat substantially parallel and adjacent the frozen superficial surface, and moving said cold surface with said slice adhered thereto along a path in a given direction.

5. The method of preparing a slice of meat which comprises: moving unfrozen meat having a leading face and a trailing face along a predetermined path, at a point along said path freezing the superficial surface of said leading face, and slicing said leading face from said meat along a plane extending through the unfrozen portion of said meat substantially parallel and adjacent the frozen superficial surface.

6. The method of preparing a slice of meat which comprises: moving unfrozen meat having a leading face and a trailing face along a predetermined path, at a point along said path contacting said leading face with a cold surface whereby to freeze the superficial surface of said leading face, slicing said leading face from said meat along a plane extending through the unfrozen portion of said meat substantially parallel and adjacent the frozen superficial surface while at said point, and moving said slice along said path.

7. The method of preparing a slice of meat which comprises: moving unfrozen meat having a leading face and a trailing face along a predetermined path, at a point along said path contacting said leading face with a movable cold surface whereby to freeze the superficial surface of said leading face and adhere said superficial surface to said cold surface, slicing said leading face from said meat along a plane extending through the unfrozen portion of said meat substantially parallel and adjacent the frozen superficial surface at said point, and moving said cold surface with said slice adhered thereto along said path.

8. The method of preparing a slice of meat which comprises: moving unfrozen meat having a leading face and a trailing face along a predetermined path, momentarily interrupting said movement of said meat when said leading face reaches a point along said path, freezing the superficial surface of said leading face at said point during said interruption in movement, and slicing said leading face from said meat along a plane extending through the unfrozen portion of said meat substantially parallel and adjacent the frozen superficial surface at said point.

9. The method of preparing a slice of meat which comprises: moving unfrozen meat having a leading face and a trailing face along a predetermined path in a given direction; applying a force to said leading face at a point along said path, said force being in a direction generally opposed to said given direction; freezing the superficial surface of said leading face during application of said force; and slicing said leading face from said meat along a plane extending through the unfrozen portion of said meat substantially parallel and adjacent the frozen superficial surface at said point.

10. The method of forming slices of meat which comprises: moving a portion of unfrozen meat having a leading edge and a trailing edge along a predetermined path, intermittently interrupting said movement as said leading edge reaches a point along said path, sequentially freezing the superficial surfaces of said leading edge during said intermittent interrupted movement, and slicing said leading edge from said meat along a plane extending through the unfrozen portion of said meat substantially parallel and adjacent the frozen superficial surface during each period of interrupted movement.

11. The method of preparing slices of meat which comprises: moving a portion of unfrozen meat having a leading edge and a trailing edge along a predetermined path, intermittently interrupting said movement as said leading edge reaches a point along said path, sequentially contacting the superficial surfaces of said leading edge during said interrupted movement with a cold surface whereby to freeze said superficial surfaces, and slicing said leading edge from said meat along a plane extending through the unfozen portion of said meat substantially parallel and adjacent the frozen superficial surfaces during each period of interrupted movement.

12. The method of preparing slices of meat which comprises: moving a portion of unfrozen meat having a leading edge and a trailing edge along a predetermined path, intermittently interrupting said movement as said leading edge reaches a point along said path, sequentially freezing the superficial surfaces of said leading edge during said interrupted movement with a cold surface whereby to freeze said superficial surfaces, and slicing said leading edge from said meat along a plane extending through the unfrozen portion of said meat substantially parallel and adjacent the frozen superficial surfaces during each period of interrupted movement, and moving said slices along said path.

13. The method of preparing slices of meat which comprises: moving a portion of unfrozen meat having a leading edge and a trailing edge along a predetermined path, intermittently interrupting said movement as said leading edge reaches a point along said path, sequentially freezing the superficial surfaces of said leading edge during said interrupted movement with a movable cold surface whereby to freeze said superficial surfaces and adhere them to said cold surfaces, slicing said leading edge from said meat along a plane extending through the unfrozen portion of said meat substantially parallel and adjacent the frozen superficial surfaces during each period of interrupted movement, and moving said cold surface with said slices adhered thereto along said path.

14. The method of producing a slice of meat which comprises: forming unfrozen meat having a leading face and a trailing face into a predetermined cross-sectional shape, butting the leading face of said meat against a cold surface whereby to freeze the superficial surface of said leading face, and slicing said leading face from said meat along a plane extending through the unfrozen portion of said meat substantially parallel and adjacent the frozen superficial surface.

15. The method of producing a slice of meat from a block of said meat which comprises: forming unfrozen meat into a block of meat having a predetermined cross-sectional shape and having a leading face and a trailing face, moving said block along a predetermined path, butting said leading face of said block against a cold surface whereby to freeze the superficial surface of said leading face, and slicing said leading face from said block along a plane extending through the unfrozen portion of said meat substantially parallel and adjacent the frozen superficial surface.

16. The method of producing slices of meat from a block of said meat which comprises: forming unfrozen meat into a block of meat having a predetermined cross-sectional shape and having a leading face and a trailing face, substantially continuously moving said block along a predetermined path, sequentially butting the leading face of said block against a cold surface whereby to freeze the superficial surfaces of said leading face, and slicing said leading face from said block along a plane extending through the unfrozen portion of said meat substantially parallel and adjacent the frozen superficial surfaces.

17. The method of producing slices of meat which comprises: continuously moving unfrozen meat having a leading face and a trailing face along a predetermined path; at a point along said path applying a movable steadying force to said leading face, said steadying force being in a direction generally normal to said leading face; freezing the superficial surface of said leading face at said point to firmly adhere said surface to said steadying force, severing a portion of said meat adhered to said force by slicing through the unfrozen meat adjacent said leading face in a plane generally parallel to said face, and continuously moving said steadying force with said severed portion adhered thereto in a direction away from said point.

References Cited in the file of this patent
UNITED STATES PATENTS

| | | |
|---|---|---|
| 1,943,019 | Henney et al. | Jan. 9, 1934 |
| 2,137,897 | McKee et al. | Nov. 22, 1938 |
| 2,140,162 | McKee | Dec. 13, 1938 |
| 2,825,652 | Berkowitz | Mar. 4, 1958 |
| 2,937,097 | Draudt et al. | May 17, 1960 |

UNITED STATES PATENT OFFICE
CERTIFICATE OF CORRECTION

Patent No. 3,108,883

October 29, 1963

Paul A. Goeser

It is hereby certified that error appears in the above numbered patent requiring correction and that the said Letters Patent should read as corrected below.

Column 3, line 54, for "cliced" read -- sliced --; line 73, for "slide" read -- slice --; column 6, lines 18 and 31, for "freezing", each occurrence, read -- contacting --; line 34, for "surfaces" read -- surface --.

Signed and sealed this 26th day of May 1964.

(SEAL)
Attest:

ERNEST W. SWIDER
Attesting Officer

EDWARD J. BRENNER
Commissioner of Patents